United States Patent Office 2,825,707
Patented Mar. 4, 1958

2,825,707

OIL-IN-WATER EMULSION TEXTILE PRINTING EXTENDER PASTES

Laszlo Auer, South Orange, N. J., assignor to J. R. Geigy, S. A., Basel, Switzerland, a corporation of Switzerland No Drawing. Application May 4, 1953
Serial No. 352,959

19 Claims. (Cl. 260—15)

GENERAL OUTLINE OF INVENTION

The object of this invention is a new textile printing paste. This paste is particularly suitable as an extender of oil-in-water emulsion pigment color concentrates and as a carrier of dyes in dyestuff printing.

In present day textile printing with pigments frequently water-in-oil emulsions are used in the trade, in spite of the fact, that solvent cleaning of equipment is troublesome in textile plants. The reason for favoring w/o type emulsions is, that color mileage of pigments is greater in water-in-oil emulsions, than in oil-in-water emulsions. Pigments used for this purpose are hydrophobic and tend to flush over to the oil phase. Where the oil phase is continuous, like in w/o emulsions, it is easy to keep pigments completely deflocculated and they yield higher color values. In oil-in-water emulsion, if pigments are incorporated into the water phase, water is the continuous phase and acts as barrier against flushing and consequently lower color values are obtained. If pigments are incorporated into the oil phase of an oil-in-water emulsion, emulsification is more difficult, degree of dispersion is of reduced character and color value stays low.

For printing purposes pigments are usually incorporated into so-called color concentrates, which may contain 5 to 20% pigment, by weight. I have found, that the extender paste, used to reduce the color strength of the color concentrate, is of paramount importance in achieving color value. There are two types of such extender pastes known in the art: (1) solvent-free "gum" solutions in water and (2) solvent containing clear emulsions. The latter type is the subject of this invention. In my co-pending application, Serial No. 180,700, dated August 21, 1950, to which this application is a continuation in part, I have shown that proper formulation and limits of ingredients, will permit full color value and brilliance in oil-in-water pigmented emulsions. Solvent containing o/w extender print pastes of the prior art contain large amount of solvents and improper proportions or selection of protective colloids. Thus they did not yield proper color value, i. e., pigment mileage.

The print pastes of this invention are also applicable to print direct dyes, Rapidogens or Indigosols, or acid dyes or vat dyes on fabrics, and represent advantages, e. g. in printing on silk and wool, by eliminating need for alkaline soaping operations.

The print pastes of my co-pending application, Serial No. 180,700, dated August 21, 1950, consist of three ingredients: (1) high viscosity methyl cellulose or carboxymethyl cellulose, (2) water, and (3) water immiscible solvents, such as aromatic or aliphatic hydrocarbons. An optional fourth ingredient being (4) a concentrated solvent soluble resin emulsion in water, as reinforcing agent, particularly useful if pastes are applied to pigment printing. Further optional ingredients are: (5) surface active agents in minor proportions, and (6) sulfoxylate. The latter is used if discharge printing is the aim with pigments, or if vats are printed and discharge or reducing agent in print paste is required.

This invention represents further improvements in the field of said copending application, Serial No. 180,700, and it permits the production of lower cost extender print pastes for pigment printing and produces prints with improved crock resistance. According to one embodiment of this invention as new reinforcing resin emulsions, oil-in-water emulsions of alkyl modified urea and melamine resins are used, which insolubilize to a satisfactory degree the cellulose ethers of the extender print pastes. Such insolubilization is accelerated by the presence of nitrocellulose, preferably applied in form of oil-in-water nitrocellulose emulsion, and by other additives as hereinafter described. The improvement in crock resistance of the prints is preferably achieved by the addition of synthetic latices of elastomers, in particular those containing polyacrylonitrile.

In my co-pending application, Serial No. 180,700, to which this application is a continuation in part, the following is the nature and the preferred proportions of ingredients:

*Nature and preferred proportions of ingredients*

*Cellulose ether.*—The cellulose ether is either methyl cellulose or carboxymethyl cellulose, applied as water soluble salt. The preferred methyl cellulose grade is the 4000 cps. type, but viscosity may be lowered to 1500 cps. type grade or any grade in between these two limits. In case of water soluble salt of carboxymethyl cellulose, sodium, ammonium or triethanolamine salts may be used. I prefer the sodium salt and use the highest obtainable viscosity grade. Commercial definition of sodium carboxymethyl cellulose is different from that of methyl cellulose, but the high viscosity sodium carboxymethyl cellulose yields just slightly lower viscosity solutions in water, at equal concentrations, than the 4000 cps. type methyl cellulose.

By weight percent, the print pastes of this invention contain 0.3% to 0.8% high viscosity cellulose ether. Based on 100 parts of water in the print paste, the cellulose ether is from about 0.7 parts to 1.6 parts.

For pigment printing purposes, I prefer methyl cellulose as the cellulose ether, as it yields greater brilliance of color and somewhat increased color mileage. In case of vat dye printing, most vat dyestuff pigments show greater color yield with sodium carboxymethyl cellulose, whereas a few show better yield with methyl cellulose. For discharge printing, where sodium formaldehyde sulfoxylate or the corresponding zinc salt are present in the paste, sodium carboxymethyl cellulose shows great advantage over methyl cellulose, as carboxymethyl cellulose salts have higher electrolyte tolerance apparently and do not cause pigment flocculation upon addition of electrolytes.

In case of other dyestuffs, both types of cellulose ether are suitable, but one may show advantage over the other in color yield with one individual dye.

*Water.*—The water content of the print pastes of this invention may range from about 47 to 61½%, but preferred top limit is 55%. Higher water content reduces color value.

*Solvent.*—The solvents of this print paste are water-immiscible. Most favored solvents are aliphatic petroleum solvents, such as varnish makers' and painters' naphtha, various grades of mineral spirits with kauri butanol values from 33 to 46 and flash points of 41 to 150° F. Flash point of 100° minimum is of advantage, on account of fire hazard. Aromatic solvents may be used, like toluol, xylol, hi-flash naphtha (high flash point solvent naphtha) and mixtures of aromatic and aliphatic hydrocarbons yielding varying kauri butanol values.

Water-immiscible esters, ketones, ethers and alcohols may be present to obtain special effect, but their use in larger proportions may increase raw material cost greatly.

Generally speaking, solvents, which evaporate ahead of water from the print paste, will yield clear and brilliant prints right away, whereas slower evaporating solvents, which remain after main portion of water evaporated, will cause a temporary gum blush, from cellulose ether deposit on top of print, which, however, disappears if print is exposed to steaming or soaping. On account of flash point and fire hazard considerations slower evaporating solvents are preferred, but where prints are not exposed to steam or water and are sold after printing, it may be necessary to use faster evaporating solvents, to avoid gum blush effects. Varnish makers' and painters' naphtha (VM&P Naphtha) and xylol are examples of the solvents which leave water at the end during co-evaporation. Mineral spirits fractions and hi-flash naphtha fractions will permit e. g. water to evaporate ahead and they stay in major proportion of volatile part towards the end of evaporation.

With regard to brilliance, aliphatic hydrocarbons yield greater brilliance, than aromatic hydrocarbons.

The solvent content of the print pastes of this invention may range from 43½% to 51½ by weight, and are in volume percents generally larger than 50% of the composition. The weight percentage may go as low as 38% of the composition in exceptional cases, but such lower solvent content causes generally speaking lower color values and lower degree of brilliance.

Based on 100 parts of water by weight in the composition, the solvent parts are 80 to 110 parts by weight, but in the exceptional cases, mentioned above, may drop as low as 62½ parts, with the noticeable loss in color value and brilliance.

The specific gravity of solvents used varies greatly. VM&P Naphtha has one of the lowest specific gravities and hi-flash naphtha has one of the highest specific gravities. In emulsions the volumetric proportions of dispersed phase to dispersion medium counts and in the print pastes of this invention the volume of the dispersed solvent phase always slightly exceeds the volume of the dispersion medium: water. However, the volume of the solvent is never as high as double that of the water volume.

Extenders, for oil-in-water pigment printing emulsions, of the pure "gum"-solution-in-water type were recommended in the art, but do not yield satisfactory color value and color brilliance with oil-in-water resin emulsion pigment color concentrates. Such color concentrates are described in my copending application, Ser. No. 91,009, filed May 2, 1949, to which the instant application is a continuation-in-part. The "gum"-solution-in-water type extender pastes have the further disadvantage, that the gums stiffen the print and have to be removed to obtain soft hand. Such removal may take part of the pigment with it.

In water-in-oil type pigment color printing, water is used as bodying agent of the extender print pastes. The art tried to use solvents for bodying effects in extender print pastes, but very large quantities of solvents were necessary to obtain the required printing consistency, such as 200 to 450 parts of solvent by weight, to 100 parts of water by weight. I found, that excessive solvent content in extender print pastes, lowers color mileage and color brilliance of prints with oil-in-water resin emulsion pigment color concentrates.

I have also found that the proportions of the ingredients of the print pastes of this invention are very critical to obtain high color value and color brilliance with pigment color concentrates. Increasing water content or increasing solvent content with corresponding necessary adjustment in proportion of the cellulose ether, all lower color value and brilliance. Even lowering viscosity of the type of cellulose ether used, or lowering its quantity below the minimum limits given, will lower color value and brilliance.

The variations in color value are of great magnitude. If we incorporate e. g. one pound of phthalocyanine blue into one gallon color concentrate and prepare in one case an oil-in-water emulsion and in the other case a water-in-oil emulsion and establish, using the latter (w/o) color concentrate and a conventional extender paste of the w/o type: a shade of 1:20 extension cut (1 color conc. and 20 extender), to match the color intensity with the formerly mentioned o/w color concentrate and using conventional extender pastes, we have to go as high as 1:5 or 1:10 extension cut. This means, in other words, that the color mileage of w/o emulsions is twice to four times as high as that of an oil-in-water emulsion, or that when using o/w emulsions we have to increase pigment content to double or quadruple to get color intensity similar to a w/o emulsion with single unit pigmentation. In addition the brilliance of conventional o/w prints are lower than brilliance of w/o emulsions. The extender print pastes of this invention, would match the above 1:20 extension cut with 1:21 or 1:24 cut and yield increased brilliance and not reduced brilliance, when compared with the comparative w/o emulsion color print. Therefore, it could be stated, that when increased color yield or increased brilliance is claimed as the result of the extender print pastes used in this invention, the magnitude of difference is in the range of 50 to 400% and not of just a few percents, hardly measurable or visible.

Further, in printing vats with the novel extender print paste, yields sharp lines, permits storage of prints for longer periods, preserves lines from bleeding during padding with hydrosulfite solution and does not represent problem of removal by laundering, as prints are soft and lofty as printed and without laundering. The latter property makes these pastes ideal for use with protein fibers, like wool and silk, where scouring with alkaline soap solutions should be avoided as much as possible.

*Concentrated resin emulsions in water as re-inforcing agents.*—Addition of concentrated resin emulsions to the extender print pastes of this invention, is particularly of advantage, when the pastes are used for pigment printing. Solvents and water evaporate. Methyl cellulose or carboxymethyl cellulose remain on the fiber. Both are soluble in water, the former more in cold water. They have to be insolubilized, to preserve full intensity of print, as obtained. The binder emulsion portion of the pigment color concentrate may achieve such insolubilization in short extensions, where comparatively larger proportions of color concentrates are used, but in longer extensions this would not work. Therefore, incorporating resin emulsions into the extender print pastes is of advantage.

For this purpose I may use from ½% up to 3½% of resin emulsion, also called herein an extender concentrate resin emulsion in the total print paste extender. If such resin emulsion is present, the limits of proportions of the base ingredients relates to the portion free of resin emulsion. E. g. if I use 3% of resin emulsion extender concentrate in the extender and 97% of the above described 3-ingredient extender print paste, the interrelationship of the 3 ingredients relates to the 97% portion, taking same as 100%.

Extender resin emulsion concentrates are described in my co-pending application, Ser. No. 91,009, above referred to, and will be described in the examples further below.

As binder resins the following may be mentioned as suitable: alkyd resins, organic solvent soluble urea and melamine formaldehyde resins, condensation products of bis-phenol and epichlorhydrin esterified with fatty acid esters, styrenated alkyds, styrenated oils, pentaerythritol esters of fatty acids, which may be advantageously precondensed with maleic anhydride, amongst others.

The organic solvent soluble amine resins, which include urea and melamine formaldehyde resins, other aldehyde resins with urea or melamine or alkylated or etherified urea and melamine, have some curing action on the cellulose ethers and tend to insolubilize them on the action of proper heat and heating cycle.

*Surface active agents.*—It should be pointed out, that the extender print pastes of this emulsion are characterized by lack of emulsifying agents, as the cellulose ethers take the place of both emulsifying agent and protective colloid or stabilizer. In many instances, particularly where lower solvent content is desired, or where color value should be further increased, or better penetration is required, the addition of surface active agents is useful. Whereas larger quantities are permissible, I use from 0.1% to 1% of active surface agent per 100 parts of print paste. Sodium lauryl alcohol sulfate is one example of such agents and it tends to improve washability with methyl cellulose containing print pastes, which is contrary to expectation and is a novel and unexpected discovery. Antifoam agents may also be incorporated and some will be listed in the examples.

*Sulfoxylate.*—Formaldehyde sulfoxylates may be incorporated into print pastes of this invention, to produce discharge printing paste extenders. Sodium carboxymethylcellulose is a satisfactory ingredient in such pastes.

*Trade names and chemical identification of resins suitable in re-inforcing resin emulsions.*—Epichlorhydrin and bis-phenol condensation product (alcohol): Epon 1004, Shell Chemical Co. Dehydrated castor oil fatty acid ester of Epon 1004: Epitex 120, Jones-Dabney Co., Louisville, Ky.

Styrenated alkyd: Styresol 4250, Reichhold Chemicals, Inc.

Phthalic anhydride-free styrenated alkyd: Soya fatty acid ester of carbic anhydride (bicyclo 2-2-1 cycloheptane delta 5 dicarboxylic anhydride 2,3) and glycerine (co-ester of fatty acids and anhydride), styrenated, Bakelite Corporation's BJS 502, RJS 153 and RJS 155 resins. Polystyrene content 25 to 75%.

Pentaerythritol-glycerine mixed ester of maleic anhydride treated fatty acids: Esskol, linseed oil base, Spencer Kellogg & Sons, Inc.

Styrenated Soyabean Oil: Keltrol-60, Spencer Kellogg & Sons, Inc.

Melmac 245-8 is a butylated melamine formaldehyde resin, 50% N. V., dissolved in 20% xylol and 30% butyl alcohol mixture.

Melmac 248-8 is dissolved in a solvent mixture similar to 245-8, has 55% N. V. and is also a butylated melamine formaldehyde resin.

Uformite MX-61 is a triazine-formaldehyde resin, 60% N. V., dissolved in 20% xylol and 20% butyl alcohol.

Uformite F-240 is a urea-formaldehyde resin, butylated, 60% N. V., dissolved 24% butyl alcohol and 16% xylol.

*Viscosity grades of methyl cellulose and carboxymethylcellulose.*—According to the Dow Chemical Company, Midland, Michigan (The new Methocel, Powdered Dow Methylcellulose, 1949 edition) in 2% aqueous solutions the absolute viscosity of methylcellulose grades has the following limits:

| Viscosity type and average viscosity, cps.: | Limits cps. |
|---|---|
| 10 | 7 to 11 |
| 15 | 13 to 18 |
| 25 | 20 to 30 |
| 100 | 80 to 150 |
| 400 | 350 to 550 |
| 1500 | 1200 to 1800 |
| 4000 | 3000 to 6000 |

Viscosity determination method is described in here referred to Dow bulletin. From point of view of this invention 10 cps., 15 cps. and 25 cps. grades are considered low viscosity type; 100 and 400 cps. grades are considered medium viscosity type and 1500 and 4000 cps. grades are considered high viscosity type.

According to Hercules Powder Company, low viscosity sodium carboxymethyl-cellulose has a viscosity of 25 to 50 cps. in 2% aqueous solution; medium viscosity sodium carboxymethylcellulose has a viscosity of 400 to 600 cps. in 2% aqueous solution and high viscosity sodium carboxymethylcellulose has a viscosity of approximately 1500 cps. in a 1% aqueous solution. Note, that H. V. type is measured in 1% solution.

*Antifoam agents.*—Methylcellulose is a strong foamer and CMC foams too. Antifoam agents may be used in quantities ranging from 0.005% to 2.000%, based on extender print paste. For methylcellulose containing extender print pastes most effective agents are, according to this invention, organic silicone compounds, like DC Antifoam A emulsion (methylpolysiloxane of grease-like consistency the emulsion being approximately 30% active) of Dow Corning Corp., Span 20 (sorbitan monolaurate), Span 85 (sorbitan trioleate), both of Atlas Powder Co., and Emulphor AG (described in examples) of General Dyestuff Corporation, alone or preferably in admixture with each other. In a surprising manner it was found, that ammonium thiocyanate, in quantities of ½ to 2%, based on methylcellulose content, eliminates almost completely the foaming tendency and yields "long," stringy print pastes.

I have found that, in some cases, variation in the water and solvent content of the extender print paste is of advantage. For instance, higher solvent content is advantageous in cases where the pigment containing resin emulsion color concentrates are of low viscosity. Increased water content is advantageous where the pigment containing resin emulsion color concentrates are of higher vicosity. Examples will demonstrate such extender print pastes further below.

*Crock reducing additives.*—As crock reducing additives, the following are useful: latices of acrylonitrile copolymers, such as copolymers of butadiene and acrylonitrile, of polyvinyl chloride, of copolymers of polyvinyl chloride and polyvinyl acetate, of polymers of isobutylene, of polychloroprene, sometimes called neoprene, amongst others. The expression "homopolymer" is herein used to describe a polymer obtained by the polymerization of a single monomer.

The elastomers mentioned for reduction of crock may also be used in a form that first a solvent solution of the dry elastomer solids is made and the solution is emulsified to form oil-in-water emulsions. A neoprene cement or hycar cement emulsified in water is a proper illustration. In view of the oil-in-water emulsion nature of the print pastes of this invention, in the illustrative examples elastomer latices will be given to illustrate the process.

*Low cost extenders with low resin solids*

One of the improvements of the instant invention is the preparation of low cost extender print pastes with low resin solids, suitable for resin emulsion pigment printing purposes. I have found that, in pigment printing of textiles, extender print pastes which contain cellulose ethers, like methylcellulose as sole non-volatile content, do not yield laundering resistant prints with the usually insufficient aging and curing cycle of textile plant procedure. This occurs apparently because the increased addition of methylcellulose solids increases the content of water soluble materials in the solid print deposit. This holds particularly good in lighter shades where a larger quantity of extender print paste is added to comparatively smaller quantity of resin containing pigmented color concentrates. In my co-pending application, Serial No. 180,700, I have shown that reinforcing extender concentrate emulsions will eliminate this drawback and will yield laundering resistant prints. Examples 1 to 3 of this specification show such reinforcing resin emulsions and Examples 4 and 5 illustrate extender print pastes containing such reinforcing resin emulsions. I have found that, if organic solvent soluble melamine or urea resins are emulsified and used as reinforcing resin emulsions, much smaller quantities of such emulsions are useful and melamine resin non-volatile content of extender print pastes may be as low as .06% to .18% and yield satisfactory results. In fact, melamine solids as low as .03% may be sucessfully used and, in some cases, higher percentages up to .70% resin solids may show advantages.

In this embodiment of my invention catalysts may be added to the print pastes which will increase the rate of cure of the melamine and urea resins and reduce the required time for the curing or the required temperature, or both. Conventional catalysts may be used. I have found that instead of conventional catalysts, chlorine containing organic compounds may act as catalyst and nitrocellulose also catalyzes the melamine conversion in this process. An example for chlorine containing catalyst additive suitable in this process is Drew Plasticizer 520 (E. F. Drew & Co.) which is a chlorinated natural fatty acid derived from fats or fatty oils and is suitable for plasticizing protective colloids such as casein and methylcellulose. The nitrocellulose is added preferably in form of a lacquer emulsion.

Example 11 illustrates this phase of the invention.

Water soluble amino resins, such as Aerotex M-3, may be also used in this phase of the invention replacing resin solids for resin solids by weight. However, I have found that solvent soluble amino resins cure faster at lower temperatures under conditions prevailing in textile plants and give excellent results, providing they are applied from stable emulsions of good quality.

*Low crock extender print pastes with low resin solids and low elastomer solids.*—The low resin solids extender print pastes as described under the previous heading and illustrated by Example 11 yield prints with good color value and good laundering resistance. However, the crock resistance of such prints may be improved by adding small quantities of crock reducing elastomer solids in form of latices, for instance. In this type of extender, small quantities of elastomer solids are used ranging from 0.2% to 1%, or even to 1.5%, based on the total weight of the extender print paste. Suitable examples are: neoprene, or butadiene-acrylonitrile copolymers alone, or in combination with polyvinyl chloride. Examples 12 and 13 illustrate this phase of the invention.

*Low crock extender print pastes suitable for use in dark shades.*—Crocking is particularly evident in the case where pigmented resin emulsion color concentrates of the type described in my co-pending applications, Serial Nos. 91,009 and 196,724, are printed in heavy shades, such as cut in proportions of 1 to 1, 1 to 2, and 1 to 4, by volume with extender print paste, such as described in my co-pending application, Serial No. 180,700. In a further improvement of my process, I have found that by introducing elastomer latices into my compositions in amounts to represent a substantial part of the film formers present, I was able to produce prints of unusually deep shades with exceptionally low crock. In this manner I was able to obtain prints with my pigmented resin compositions with resistance to crocking equalling and, in some cases, exceeding that obtained with comparable shades in dyestuff printing. Most of such latices are marketed in concentrations of 30% to 60% non-volatile content. I have found that additions of such latices in the proportion of 5% to 20% of latex based on the print paste by weight will produce prints with the required extreme low crock. Examples of the list of the elastomers in this phase of the invention are found above in this specification under the heading "Crock Reducing Additives." I prefer to use compositions containing acrylonitrile copolymers, but satisfactory results may be obtained with the others listed above also. Proportions and schematic formulations are illustrated in Examples 14-A to 14-E. The extender print pastes herein referred to may be used as sole extenders of color concentrates or may be used to form standard extensions of the dark shades, such as a 1 to 2 cut for example, wherein the standard cuts are further reduced with regular extender print pastes which do not contain crock reducing agents. The cuts herein mentioned mean in the first position always the quantities of the color concentrate, such as the type described in my co-pending applications, Serial Nos. 91,009 and 196,724.

*Extender print pastes for discharge printing.*—In my co-pending application, Serial No. 180,700, I have described extender print pastes which are suitable for discharge printing. I have found that if the carboxymethylcellulose solution is made of high viscosity carboxymethylcellulose: prints will be obtained which have improved laundering resistance. Example 15 illustrates this phase of the invention.

*Prevention of mark-off.*—During extensive laundering, pigment prints sometimes show a mark-off in a manner that the white unprinted portion is stained by pigment redeposition from the laundering liquor. I have found that such mark-off can be prevented if some carboxymethylcellulose is incorporated alongside with methylcellulose in the extender print paste. Proportions are, for instance, replacing methylcellulose solids to the degree of 10 to 30% with carboxymethylcellulose solids, using equal viscosity types.

The illustrative examples which will follow here are intended to illustrate the process and not to limit same.

*Printing on naphtholated grounds.*—Example 16 describes improvement in the art of pigment printing on naphtholated grounds.

ILLUSTRATIVE EXAMPLES

The following examples illustrate the invention. All percents and parts are by weight, except where volume parts or percents are specified.

*Examples*

EXAMPLE 1.—CONCENTRATED OIL-IN-WATER RESIN EMULSION, SUITABLE TO REINFORCE PIGMENT PRINTING EXTENDER PRINT PASTES 42.15 parts of E-polyester resin of Example 2 of my co-pending application, Serial No. 91,009, above referred to (dehydrated castor oil fatty acid ester of an alcohol obtained by condensing bis-phenol and epichlorohydrin), dissolved in xylol and having 50% non-volatile (N. V.) content, 0.31 parts of mixed naphthenate driers, 12.22 parts of 10% sodium lauryl sulfate solution in water, 20.65 parts of a 20% casein solution in water containing ammonia, said casein solution containing antifouling agents, 5.48 parts of ammonium hydroxide solution prepared by mixing 1 part of concentrated ammonium hydroxide and 1 part of water, 10.54 parts of 20% water solution of sodium carboxymethyl cellulose, low viscosity type, and 8.65 parts of water, are made into an emulsion in the following manner:

Add to the resin solution ⅔ of the sodium lauryl sulfate solution, mix the remaining ⅓ with the water and the casein solution in a separate container and add then to the resin solution containing mixture under agitation, this latter mixture of emulsifying agent, casein and water, slowly, in increments. Add the ammonium hydroxide solution and add finally the sodium carboxymethyl cellulose solution. Homogenize the emulsion obtained. This emulsion is suitable as additive to extender print paste emulsions of this invention, to reinforce the same.

EXAMPLE 2.—EMULSION-POLYMERIZED OIL-IN-WATER RESIN EMULSION, SUITABLE TO REINFORCE PIGMENT PRINTING EXTENDER PRINT PASTES

An emulsion-aggregated (polymerized) binder is prepared from the E-polyester solution used in Example 1, according to Example 1, by the following changes: deducting 3.58 parts of the water added and replacing it with 3.58 parts of a 30 volume percent hydrogen peroxide solution. This is added at the stage after which ammonium hydroxide is added, but before the sodium carboxymethyl cellulose is incorporated. The hydrogen peroxide is added in increments, while the emulsion is is agitated slowly and subsiding of foam is achieved, before subsequent increment is added. The addition of hydrogen peroxide may be carried out during a period of 2 to 12 hours. The sodium carboxymethyl cellulose solution is added after the emulsion-aggregation process is completed. This emulsion may be used for similar purposes as the product of Example 1.

EXAMPLE 3.—MELAMINE - FORMALDEHYDE RESIN EMULSION. SUITABLE TO REINFORCE PIGMENT PRINTING EXTENDER PRINT PASTES

The emulsion of Example 2 is repeated with the following changes: (a) 10% of the E-polyester resin solution is replaced with a 50% solution of a butylated melamine formaldehyde resin, having 50% N. V. and 20% xylol and 30% butyl alcohol as solvent. A suitable resin is Melmac 245–8, manufactured by the American Cyanamid Co., (b) the sodium carboxymethyl cellulose solution is replaced with a water solution of 20 parts of low viscosity methyl cellulose, 15 cps. type, in 80 parts of water. The resulting emulsion is suitable for the same use as the products of Examples 1 and 2.

If methyl cellulose, low viscosity type is used, this may be present during the stage of emulsion-aggregation, i. e., when the hydrogen peroxide is incorporated.

The E-polyester resin of Examples 1 to 3 may be replaced with other resins mentioned further above, such as styrenated alkyds, styrenated oils, etc. The melamine resin of Example 3 may be replaced with other amine aldehyde resins, such as urea-formaldehyde resins, substituted (alkylated) urea-formaldehyde resins, substituted (alkylated) melamine-formaldehyde resins, similar amine resins formed with other suitable aldehydes, etc. The organic solvent soluble amine-aldehyde resins are usually ethers of low molecular alcohols, such as methyl, ethyl, butyl, capryl alcohol. To avoid solubility, which may disturb emulsions, chain length from butyl to capryl are preferred.

Examples 4 to 7 show the preparation of clear extender print pastes suitable to adjust the color strength of color concentrates of oil-in-water resin emulsion type. The color concentrates and the extender print pastes can be mixed in various proportions to yield cuts of varying color strength. Cuts from 1 to 1 up to 1:200 are normally used.

EXAMPLE 4

5.90 parts of the emulsion of Example 3, 47.05 parts of a 3% water solution of 4000 cps. methyl cellulose, 47.05 parts of water are mixed and homogenized. Under agitation with a suitable mixer, like the Eppenbach Homomixer, 100 parts of mineral spirits are stirred into the former emulsion in increments. The mineral spirits used in this example has a bulking value of 0.1515 gallon per pound, a flash point of 100° F., a kauri-butanol value of 44 to 46, and is marketed by the American Mineral Spirits Company under the trade name of Amsco Mineral Spirits #46.

EXAMPLE 5

To make an extender print paste similar to Example 4, but where the volumetric relation of solvent to water phase is changed to yield a lower solvent percentage: 23.563 parts of a 3% methylcellulose solution in water, using 4000 cps. methylcellulose, 23.563 parts of water and 2.874 parts of concentrated resin emulsion of Example 3, are mixed and 45.710 parts of mineral spirits of Example 4 are incorporated in a manner as described in Example 4. The resulting emulsion has a somewhat lower viscosity than the product of Example 4. This extender emulsion has about 0.739% methylcellulose, 48.49% water, 47.759% of solvent, and 3.003% reinforcing concentrated resin emulsion.

EXAMPLE 6.—RESIN-FREE EXTENDER PASTE 0.750 part of 4000 cps. high viscosity methylcellulose is dissolved in 49.250 parts of water. 50 parts of mineral spirits of Example 4 is incorporated in increments, under proper agitation. A viscous print paste is obtained.

EXAMPLE 7.—EXTENDER PRINT PASTE OF EXAMPLE 4, WHERE ONE HALF OF METHYL CELLULOSE IS REPLACED BY WATER 0.353 part of 4000 cps. high viscosity methyl-cellulose is dissolved in 46.773 parts of water, yielding an 0.75% methyl-cellulose solution. This is mixed with a concentrated oil-in-water resin emulsion of Example 3, taking 2.874 parts of the latter. The resulting product is agitated and 50 parts of mineral spirits of Example 4 are incorporated in increments under proper agitation. The 50% lower content in high viscosity methylcellulose, its water phase and consequently the emulsion has lower viscosity. The product is a fluid viscous emulsion with good printing qualities.

Other formulations having various relationships of ingredients may be used for the extenders. In the following table, proportions by weight are shown of the various ingredients, assuming the water content to be 100 parts. In these examples where reinforcing resin emulsions may be used, those resin emulsions were not considered in the computation and the ensuing analysis is based on the residual part:

| Solvent | High Viscosity Cellulose Ether | Other Ingredients |
|---|---|---|
| 107.712 | 1.523 | |
| 62.694 | 0.887 | |
| 98.476 | 1.524 | |
| 101.523 | 1.523 | |
| 84.388 | 1.266 | 0.938 Duponol ME. |
| 83.604 | 1.254 | 0.929 Duponol ME. |
| 92.813 | 1.524 | |
| 100.756 | 0.756 | |
| 83.291 | 1.249 | 0.925 Duponol ME and 1.496 Aerotex M-3 dry. |
| 82.655 | 1.240 | 0.918 Duponol ME and 4.545 Aerotex M-3 dry. |
| 106.900 | 0.754 | |
| 107.304 | 1.138 | |
| 104.480 | 1.477 | |
| 103.713 | 0.732 | |
| 103.092 | 1.522 | |
| 89.744 | 1.522 | |
| 80.569 | 1.246 | 0.562 Duponol ME. |
| 76.740 | 1.260 | 0.536 Duponol ME. |
| 87.418 | 1.236 | 0.583 Duponol ME. |
| 53.122 | 0.750 | 0.472 Duponol ME. |
| 97.944 | 1.469 | 0.392 Duponol ME. |

EXAMPLE 8.—EXTENDER PRINT PASTE WITH 1% WATER SOLUBLE MELAMINE-FORMALDEHYDE RESIN ADDITION

Water soluble amine-formaldehyde resins or amine-aldehyde resins may be incorporated into the extenders of this invention and they facilitate the insolubilization of cellulose ethers, by curing them on the action of heat. Trimethylol melamine and hexamethylol melamine may be used, or their water soluble alcohol ethers, such as methyl ether or ethyl ether. Aerotex M-3 resin, manufactured by the American Cyanamid Co., is a methyl ether (trimethylether) of trimethylol melamine and is marketed in a water solution with 80% non-volatile content. In this example, 99 parts of the extender print paste of Example 6 are mixed with 1 part of Aerotex M-3 resin. The resulting extender print paste yields prints, which when cured properly, will yield extremely laundering resistant prints. Catalysts may be added to the emulsion to catalyse the melamine resin's curing. Diammonium acid phosphate, ammonium sulfate and benzoic acid may be mentioned as suitable catalysts.

EXAMPLE 9.—EXTENDER PRINT PASTES WITH EMULSIFYING AGENTS

In the above examples no emulsifying agent is present, except where reinforcing resin emulsions are used. In the latter case, their emulsifying agent is present in the print paste. Addition of emulsifying agents may be desirable for various reasons. Some are listed here: further increase of stability; easier mixing with dyes, pigment dispersions and pigment color concentrates; reduction of foaming tendency; avoiding gum blush with e. g. methyl cellulose.

Gum blush, as a white, slightly opaque deposit of traces of methyl-cellulose, can be observed, e. g. on pigment prints, where solvents evaporate slower than water, like the mineral spirits used in some of the examples. VM&P Naphtha and xylol do not show such gum blush. The gum blush disappears upon soaping or steaming, but many times prints are marketed without aftertreatment.

In the following examples to 100 parts of extender print paste of Example 4, 1 part of surface active agent was added. The examples list the surface active agents used.

*Example 9–a.*—1% ethofat 142–20 (Armour & Co.), non-ionic, mono-fatty acid ester of polyethylene glycols, red oil (technical oleic acid) as acid and 10 mols of ethylene oxide per fatty acid molecule. Spec. grav. 1.028.

*Example 9–b.*—1% Tween 85 (Atlas Powder Co.), polyoxyethylene sorbitan trioleate.

*Example 9–c.*—1% Emulphor AG (General Dyestuffs Corporation) ethylene oxide fatty acid condensate (polyglycol ester of long chain fatty acid), oleic acid type fatty acid. Non-ionic.

*Example 9–d.*—1% Tergitol 7 (Carbide & Carbon Chemicals Corp.), sodium heptadecyl sulfate, branched chain, non-ionic.

*Example 9–e.*—Aerosol OT (American Cyanamid Co.), dioctyl sodium sulfosuccinate. Anionic. 1%.

*Example 9–f.*—Sterox SK (Monsanto Chemical Co.), poly-oxyethylene thioether, non-ionic, 1%.

*Example 9–g.*—Avcolube 100 (Atlas Powder Co.), sorbitan monopalmitate 50% and polyoxyethylene sorbitan monopalmitate 50%, mixture, non-ionic, 1%.

*Example 9–h.*—Atlas G-2859 (Atlas Powder Co.), polyoxyethylene sorbitol 4, 5-oleate, non-ionic, 1%.

*Example 9–i.*—Victawet 12 (Victor Chemical Co.), phosphoric acid ester, in which one of the hydrogens of phosphoric acid is replaced with a medium chain alkyl group (like polyethylene glycol radical) and two of the hydrogens is replaced with water solubilizing groups of alcohols of medium chain length. 1%. Non-ionic. This compound has the following formula: medium chain alkyl

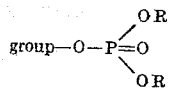

*Example 9–j.*—Victamul 89 (Victor Chemical Co.), non-ionic organic ester of phosphoric acid. 1%.

Viscosity of the surface active agent containing print pastes ranged in the following order, from most viscous to least viscous: Victawet 12, Tergitol 7, Atlas G2859, Emulphor AG, Avcolube 100, Victamul 89, Ethofat 142–20, Tween 85, Aerosol OT, Sterox SK. With regard to avoiding gum blush in pigment prints, best results were obtained with Emulphor AG and Atlas G-2859. Victawet 12 gave very lively colors. Emulphor AG reduced foaming tendency of paste most effectively.

EXAMPLE 10.—EXTENDER PRINT PASTES WITH CATIONIC REINFORCING RESIN EMULSIONS

For many purposes cationic emulsions show advantages. The extender print pastes of this invention may be made cationic, either by adding cationic surface active agents to the non-reinforced print pastes, or using a cationic reinforcing emulsion of resin as reinforcing resin emulsion. Example 5 can be made cationic, by replacing the protective colloid casein in the reinforcing resin emulsion with 4000 cps. methyl cellulose and replacing the antionic emulsifying agent with either of the following: Lauryl pyridinium chloride, cetyl-dimethylbenzyl ammonium chloride (Triton K-60 of Rohm & Haas Co.), methyl dodecyl benzyl trimethyl ammonium chloride (Hyamine 2389 of Rohm & Haas Co.), amongst others. (Change emulsifying agent in reinforcing resin emulsion.)

Examples 1 to 10 have been mentioned in my co-pending application, Serial No. 180,700, to which the instant case is a continuation in part.

The following examples illustrate the further improvements of this invention:

EXAMPLE 11.—LOW COST EXTENDERS WITH LOW RESIN SOLIDS

The following examples will illustrate the composition of the ingredients and additives in this phase of the invention:

*Example 11–A.—Illustrative composition of melamine resin emulsion*

| | Parts |
|---|---|
| Melmac 245-8 (American Cyanamid Co.) (50% N. V., 30% butanol, 20% xylol) | 50.00 |
| Triton 771 (Rohm & Haas Co.) (alkali metal salt of a cresol-derived aryl alkyl polyether sulphonate—30% active) | 6.00 |
| 3% 4000 cps. methylcellulose water solution | 34.00 |
| Water | 10.00 |
| | 100.00 |

(This product contains 25% melamine resin solids.)

*Example 11–B.—Another illustrative composition of melamine resin emulsion*

| | Parts |
|---|---|
| Resimene 882 (Monsanto Chemical Co.) (alkyl modified melamine-formaldehyde resin, 66% non-volatile in xylol) and further described above in Example 3 | 38.50 |
| Triton 771, as above | 6.00 |
| 3% 4000 cps. methylcellulose water solution | 34.00 |
| Water | 21.50 |
| | 100.00 |

(This product contains 25% melamine resin solids.)

*Example 11-C.—Illustrative composition of nitrocellulose emulsion*

|  | Parts |
|---|---|
| 12.1% nitrocellulose emulsion: | |
| ½ sec. nitrocellulose (70% nitrocotton, 30% butanol | 17.25 |
| Dibutyl phthalate | 3.00 |
| Xylol | 9.75 |
| Methyl isobutyl ketone | 10.00 |
| Amyl acetate | 10.00 |
| | 50.00 |

This is made a lacquer solution and is then emulsified in a water phase consisting of:

| | | |
|---|---|---|
| 15 cps. methylcellulose, dry | 3.00 | |
| Duponol ME, dry (sodium lauryl sulfate) | .25 | |
| Water | 46.75 | 50.00 |
| Total | | 100.00 |

(This product contains about 12.1% nitrocellulose solids.)

The use of the above additives is demonstrated further below on the following resin-free extender print paste:

*Example 11-D.—Resin-free extender print paste*

| | Parts |
|---|---|
| 4000 cps. methylcellulose, dry | .553 |
| Water | 49.447 |
| Amsco #46 mineral spirits | 50.000 |
| | 100.000 |

The following extender print pastes illustrate the improved reinforced products of this example:

Example 11-1:

| | Parts |
|---|---|
| Extender print paste of Example 11-D | 99.75 |
| Emulsion of Example 11-A | .25 |
| | 100.00 |

(This extender print paste contains about 0.063% melamine solids.)

Example 11-2:

| | Parts |
|---|---|
| Extender print paste of Example 11-D | 99.25 |
| Emulsion of Example 11-A | .75 |
| | 100.00 |

(This extender print paste contains about .190% melamine solids.)

Examples 11-1 and 11-2 illustrate two useful proportions for this particular additive.

Example 11-3:

| | Parts |
|---|---|
| Extender print paste of Example 11-D | 99.75 |
| Emulsion of Example 11-B | .25 |
| | 100.00 |

(This extender print paste contains about 0.063% melamine solids.)

Example 11-4:

| | Parts |
|---|---|
| Extender print paste of Example 11-D | 99.25 |
| Emulsion of Example 11-B | .75 |
| | 100.00 |

(This extender print paste contains about .190% melamine solids.)

The emulsion of Example 11-C is not used alone as an additive but in conjunction with either emulsions of examples 11-A or 11-B. An illustrative example is as follows:

Example 11-5:

| | Parts |
|---|---|
| Extender print paste of Example 11-D | 99.60 |
| Emulsion of Example 11-A or 11-B | .25 |
| Emulsion of Example 11-C | .15 |
| | 100.00% by wt. |

(This example contains approximately 0.063% melamine solids and 0.018% nitrocellulose solids.)

Example 11-6:

| | Parts |
|---|---|
| Extender print paste of Example 11-D | 99.05 |
| Emulsion of Example 11-A or 11-B | .75 |
| Emulsion of Example 11-C | .20 |
| | 100.00% by wt. |

(This example contains approximately 0.19% melamine solids and 0.024% nitrocellulose solids.)

Resimene 882 is a melamine resin, 66% non-volatile, in which xylol is the sole solvent. It is a product of the Monsanto Chemical Company.

Melmac 245-8 is a melamine resin, 50% non-volatile, the solvent portion consisting of 30% xylol, 20% butanol. It is a product of the American Cyanamid Company.

The ½ second nitrocellulose is a product of the Hercules Powder Company.

EXAMPLES 12 AND 13.—LOW CROCK EXTENDER PRINT PASTES WITH LOW RESIN SOLIDS

I have found that the low resin content low cost extender print pastes can be improved greatly to yield prints with improved crock resistance by adding thereto Elastomer Latices; in particular, such which are copolymers of acrylonitrile. The following will illustrate this phase of the invention:

Example 12:

| | Parts |
|---|---|
| 3% 4000 cps. methylcellulose water solution | 10.00 |
| Water | 37.63 |
| Triethanolamine | .55 |
| Duponol WAQ (sodium lauryl sulfate, approximately 30% active) | .55 |
| Antifoam agent | .55 |
| Mineral spirits, 44KB, value | 50.00 |
| Melamine emulsion of Example 11-A (25% melamine resin solids) | .72 |
| | 100.00 |

(On this product the total melamine resin solids in 100 parts is 0.18%.)

This example is the base for elastomer additives as described in Example 13.

Example 13:

| | Parts |
|---|---|
| 10% 4000 cps. methylcellulose water solution | 10.00 |
| Water | 35.98 |
| Triethanolamine | .55 |
| Duponol WAQ | .55 |
| Antifoam agent | .55 |
| Mineral spirits, 44KB value | 50.00 |
| 25% melamine solids emulsion of Example 11-A | .72 |
| Chemigum 245-CHS (Goodyear Tire & Rubber Company, Inc., Chemical Division). A butadiene acrylonitrile copolymer latex, 42.5% N. V.) | 1.65 |
| | 100.00 |

(This emulsion has 0.18% resin solids and 0.70% elastomer solids.)

In this example the 1.65 parts of the 42.5% N. V. latex can be replaced with a mixture of .54 part of Geon 552 latex 50% N. V. (Goodrich Chemical Company) and 1.01 parts of Chemigum 245 CHS latex. Without changing elastomer solids, the same replacement can be made with 1.27 parts of Chemigum 200 latex (55% N. V.), adjusting the water content in the formulation higher, to compensate for the difference between 1.65 and 1.27 latex parts.

In another alternative, the latex portion of this example can be replaced by equal parts of Hycar 1571 latex (Goodrich Chemical Company) (42.5% N. V.) and a 25% zinc oxide water dispersion 0.024 parts and adjusting the water content of the formulation accordingly to balance to 100 parts. The last mentioned latex is a type which cures by the addition of zinc oxide on the action of heat. Hycar 1571 is a copolymer of acrylonitrile, methacrylic acid and butadiene and is of the type described in Example 5 of U. S. Patent 2,724,707.

In this example extender print pastes have been shown containing a small amount of melamine resin in an emulsified form and a small quantity of elastomer solids. The quantity of latex solids may be increased in this example up to about 1% or to about 1½%, based on the total extender print paste.

Chemigum 200 (Goodyear) is a latex of a copolymer of butadiene 70% and acrylonitrile 30%, about 55% N. V. content.

EXAMPLE 14.—LOW CROCK EXTENDER PRINT PASTES WITH HIGH LATEX SOLIDS AND USING REINFORCING RESIN EMULSION

Examples 14–A, 14–B, 14–C, 14–D and 14–E, show the composition of five extender print pastes using various latex additives in varying proportions in table form. Section I of this table shows the individual extender print pastes on 100 weight parts basis. Section II of the table, analyzes the same five extender print pastes in a manner that 100 parts of the base extender, which includes Duponol WAQ as part of the base extender, is illustrated separately and the proportions of the other additives are shown in addition to the said 100 parts. Section III shows a similar analysis to Section II with the difference that the Duponol WAQ is also shown in the separate additives and the base extender does not contain same. This form of demonstration has been chosen to clarify the correlation of ingredients.

Chemigum 245 CHS is a butadiene acrylonitrile copolymer having 65% butadiene and 33% acrylonitrile ratio, has particle sizes of 1,500 to 2,000 angstrom units, has 40% to 45% total solids (the product used had actually 42.5% solids) and is marketed by Goodyear Tire & Rubber Company, Inc., Chemical Division.

Hycar 1551 is the butadiene acrylonitrile copolymer latex having 60% butadiene and 40% acrylonitrile ratio. The particle size is about 2,000 angstrom units and the non-volatile content is about 50%.

Geon 552 is a mixture of butadiene acrylonitrile copolymer latex 45% in the elastomer solids and a polyvinyl chloride latex 55% in the elastomer solids. The Geon 552 latex is of about 49% non-volatile content. All of the three latices here mentioned are anionic in nature.

The reinforcing resin emulsion used in Examples 14–A to 14–E is that of Example 3 of the specification.

The preparation of the product in this example can be basically made by three methods:

(1) That the latices and Duponol and reinforcing resin emulsion are pre-mixed to an extender concentrate and incorporated into the water phase of the extender print pastes prior to the addition of the solvents.

(2) The base extender print pastes as shown in the 100 parts of section II or section III of the tables is first prepared and the other ingredients added at the end.

(3) The individual water containing ingredients and water soluble materials are combined and the solvent is added in increments. In all cases at the phase where the solvent is added, an emulsifying type mixer is required, such as an enclosed turbine type high speed mixer.

LOW CROCK EXTENDERS

SECTION I

| Examples | 14–A | 14–B | 14–C | 14–D | 14–E |
| --- | --- | --- | --- | --- | --- |
| Chemigum 245–CHS | 8.30 | 6.57 | | 8.78 | |
| Hycar 1551 | | | 8.14 | | 7.45 |
| Geon 552 | 5.16 | 4.09 | 5.98 | 5.46 | 5.47 |
| Base Emulsion [1] | 2.58 | 2.04 | 2.99 | 2.73 | 2.74 |
| Duponol WAQ | 2.21 | 1.74 | 2.34 | 2.33 | 2.24 |
| 3% 4,000 cps. M. C. Water Sol. | 14.90 | 8.21 | 7.80 | 11.00 | 10.96 |
| Water | 24.65 | 21.18 | 19.43 | 28.20 | 29.56 |
| Mineral Spirits, 44 KB value | 42.20 | 55.82 | 53.00 | 41.04 | 41.12 |
| Antifoam Agent | | 0.35 | 0.32 | 0.46 | 0.46 |
| Total | 100.00 | 100.00 | 100.00 | 100.00 | 100.00 |

SECTION II

| | 14–A | 14–B | 14–C | 14–D | 14–E |
| --- | --- | --- | --- | --- | --- |
| 3% 4,000 cps. M. C. Water Sol. | 17.75 | 9.39 | 9.43 | 13.25 | 13.00 |
| Water | 29.50 | 24.32 | 23.43 | 34.00 | 35.05 |
| Mineral Spirits, 44 KB value | 50.30 | 63.90 | 63.95 | 49.40 | 48.76 |
| Duponol WAQ | 2.45 | 1.99 | 2.82 | 2.80 | 2.66 |
| Antifoam Agent | | 0.40 | 0.37 | 0.55 | 0.53 |
| Total | 100.00 | 100.00 | 100.00 | 100.00 | 100.00 |
| Chemigum 245–CHS | 9.83 | 7.50 | | 10.76 | |
| Hycar 1551 | | | 9.99 | | 8.33 |
| Geon 552 | 6.11 | 4.67 | 7.34 | 6.69 | 6.49 |
| Base Emul.[1] | 3.06 | 2.33 | 3.67 | 3.35 | 3.24 |
| Total | 19.00 | 14.50 | 21.00 | 20.80 | 18.56 |
| Grand Total | 119.00 | 114.50 | 121.00 | 120.80 | 118.56 |

SECTION III

| | 14–A | 14–B | 14–C | 14–D | 14–E |
| --- | --- | --- | --- | --- | --- |
| 3% 4,000 cps. M. C. Water Sol. | 18.20 | 9.61 | 9.70 | 13.66 | 13.35 |
| Water | 30.30 | 24.75 | 24.12 | 35.00 | 36.00 |
| Mineral Spirits, 44 KB value | 51.50 | 65.20 | 65.80 | 50.77 | 50.09 |
| Antifoam Agent | | 0.44 | 0.38 | 0.57 | 0.56 |
| Total | 100.00 | 100.00 | 100.00 | 100.00 | 100.00 |
| Duponol WAQ | 2.71 | 2.04 | 2.91 | 2.88 | 2.73 |
| Chemigum 245–CHS | 10.14 | 7.76 | | 10.85 | |
| Hycar 1551 | | | 10.10 | | 9.07 |
| Geon 552 | 6.31 | 4.83 | 7.43 | 6.75 | 6.66 |
| Base Emul.[1] | 3.15 | 2.41 | 3.72 | 3.38 | 3.34 |
| Total | 22.31 | 17.04 | 24.16 | 23.86 | 21.80 |
| Grand Total | 122.31 | 117.04 | 124.16 | 123.86 | 121.80 |

[1] The base emulsion herein used is the reinforcing resin emulsion of Example 3.

EXAMPLE 15.—EXTENDER PRINT PASTES FOR DISCHARGE PRINTING

In preparing a satisfactory extender print paste for discharge printing, there are the following points to consider:

(1) Methylcellulose, if used alone, is unstable in the presence of large quantities of sulfoxylate.

(2) Carboxymethylcellulose enables the incorporation of large quantities of sulfoxylate into methylcellulose containing extender print pastes.

(3) Methylcellulose containing extender print pastes yield brighter colors and more laundering resistant prints than carboxymethylcellulose containing print pastes.

The following two examples will demonstrate the preparation of satisfactory print pastes for discharge printing:

*Example 15–A.—Preparation of master solution of sulfoxylate*: Prepare a 10% solution of CMC (carboxymethylcellulose) low viscosity, another solution of 50% sodium formaldehyde sulfoxylate, and finally a 10% solution of Duponol ME in water. These solutions are combined in the following proportions:

| | |
| --- | --- |
| 10% solution CMC low viscosity | 28.00 |
| 50% solution sodium formaldehyde sulfoxylate | 64.00 |
| 10% solution Duponol ME | 8.00 |
| | 100.00 |

Preparation: Add the sodium formaldehyde sulfoxylate solution to the CMC solution gradually while mixing; then add the Duponol solution and mix thoroughly preferably with a high speed enclosed turbine water such as an Eppenbach Homomixer.

This master solution contains 25% sulfoxylate.

*Example 15–B.—Alternative preparation of master solution of sulfoxylate*: (1) Dissolve sodium sulfoxylate (like Rongalite) or zinc sulfoxylate (Decroline) 30 parts in 70 parts hot water in the presence of ammonia.

(2) Prepare a 3% sodium carboxymethylcellulose heavy viscosity solution in water (CMC HV).

Mixture: Mix two parts of the sulfoxylate solution (1) with one part of the CMC solution (2).

This master solution contains 20% sulfoxylate.

According to this Example 15, these master solutions are used to incorporate the sulfoxylate into the print pastes, which consist of a color concentrate component and an extender print paste component. The last two mentioned components of the print paste are mixed in the proportion required to get the proper shade, and the master solution is added to the extent to incorporate a satisfactory percentage of sulfoxylate into the print paste required for the proper discharging of the background color of the fabric. Quantity varies depending on background dye and its concentration. The discharging is carried out in the regular vat agers by customary procedure.

As an alternative procedure, the master solution may be added to the extender print paste first, yielding a discharge extender, which is then subsequently mixed with the color concentrates.

To avoid color losses during soaping operation, which might be caused by the large amount of water-soluble salt in the print deposit, I have found it to be of advantage to treat the printed fabric after the discharge operation is completed with a soap solution, before the regular soaping operation is carried out. Such soap solution can be prepared by using a cationic surface active agent in the proportion of about 0.5% and, in addition, 1% to 2% of formaldehyde solution. After the fabric has been treated with this special solution, the fabric can be further soaped in a conventional manner. Examples of cationic agents are: Sapamine MS (Ciba), Triton K–60 (stearyl dimethyl benzyl ammonium chloride) and Hyamine 2389 (methyldodecyl-benzyl trimethyl ammonium chloride). (Rohm & Haas). Sapamines are long chain cationic compounds obtained by acylating an unsymmetrical dialkyl ethylenediamine with a fatty acid chloride, usually oleic acid chloride. They are quaternized by the addition of alkyl halides or sulfates. Sapamine MS is a quaternary ammonium compound of this type.

EXAMPLE 16.—PRINTING ON NAPHTHOLATED GROUNDS

The naphtholated grounds are prepared by impregnating the fabric with caustic and a naphthol, such as Naphthol AS. It is known in the art that it is hard to carry out pigment printing on naphtholated grounds. I have found that if ammonium salts in the ranges of 0.5% to 4% are incorporated in the print pastes, they produce excellent prints on naphtholated grounds with good color value, brilliance, and laundering resistance. Examples are:

Ammonium formate
Ammonium sulphate
Ammonium chloride
Ammonium citrate
Ammonium gluconate
Ammonium thiocyanate Ammonium salts may be replaced by salts of triethanolamine, monoethanolamine, methylamine, dimethylamine, and other volatile or weak bases.

I prefer to use ammonium formate in the proportion of 1 to 2% based on the print paste.

I claim:

1. A composition of matter which is an oil-in-water type emulsion textile printing paste useful as an extender for pigment printing and as a carrier for dyestuff printing, said paste being an admixture of component I and component II, in which component I consists of an oil-in-water type aqueous emulsion containing water, about 40–66% by weight of a water-immiscible hydrocarbon solvent and 0.3% to 0.8% by weight of a water soluble cellulose ether which yields in a 2% aqueous solution at least 1200 cps. viscosity at 20° C., said cellulose ether being dissolved in the water, and in which component II is selected from the group consisting of (a) a reinforcing oil-in-water type aqueous emulsion of a substantially water-immiscible organic solvent solution of a water-insoluble amine-aldehyde resin, said reinforcing emulsion having said resin as sole resin constituent, (b) an elastomer latex selected from the group consisting of homopolymers of vinyl chloride, isobutylene, chloroprene, a copolymer of vinyl chloride and vinyl acetate and a copolymer of butadiene and acrylonitrile, and (c) a mixture of II(a) and II(b).

2. The composition of matter of claim 1, in which the cellulose ether is methylcellulose.

3. The composition of matter of claim 1, in which the cellulose ether is a mixture of 10% to 30% of a water-soluble salt of carboxymethylcellulose and 90% to 70% of methylcellulose.

4. The composition of matter of claim 1, in which component II(a) supplies 0.03% to 0.70% of amine-aldehyde resin solids to the total composition of matter.

5. The composition of matter of claim 1, in which component II(a) is an organic solvent soluble melamine-formaldehyde resin emulsion.

6. The composition of matter of claim 1, in which component II(a) is an organic solvent soluble urea-formaldehyde resin emulsion.

7. The composition of matter of claim 1, in which component II(a) and component II(b) are simultaneously present and in quantities such that II(a) supplies 0.03% to 0.70% amine-aldehyde resin solids and II(b) supplies 0.2% to 1½% elastomer solids to the total composition of matter.

8. The composition of matter of claim 1, in which component II(b) is added in proportion of 5% to 20% based on the weight of component I and in which the latex used has 30% to 60% elastomer solids content.

9. The composition of matter of claim 1, in which component II(b) is a butadiene-acrylonitrile copolymer latex.

10. The composition of matter of claim 1, in which component II(b) is a polychloroprene latex.

11. The composition of matter of claim 1, in which component II(b) is a mixture of a polyvinyl chloride latex and a butadiene-acrylonitrile copolymer latex and where in the total latex solids the butadiene-acrylonitrile copolymer content is less than 50%.

12. The composition of claim 1, in which the component I comprises a water-soluble salt of carboxymethylcellulose and methylcellulose and also comprises a formaldehyde sulfoxylate in quantities of 1% to 18% of the total composition of matter.

13. The composition of matter of claim 1, in which there is incorporated a salt of a weak base and strong acid, said salt being water soluble, said weak base being monovalent and the salt content being from about 0.5% to about 4% of the weight of the total composition of matter, said composition of matter being suitable as a print paste extender for pigmented resin emulsion color concentrates in printing on naphtholated grounds.

14. A paste according to claim 1, in which component II(a) is an organic solvent soluble in melamine-formaldehyde resin in emulsified state.

15. A composition of matter according to claim 1 wherein there is employed, as component II(a) an oil-in-water emulsion of an organic solvent soluble melamine-formaldehyde resin comprising in 100 parts of said emulsion 38.5 to 50 parts of said resin in organic solvent solution, and also comprising an alkali metal salt of an aryl-alkyl polyether sulfonate as emulsifying agent and a high viscosity methyl-cellulose as a protective colloid.

16. A composition of matter according to claim 1, in which component II(b) comprises a latex of a copolymer of acrylonitrile, methacrylic acid and butadiene.

17. The composition of matter of claim 4, in which there is incorporated as an additional component, a nitrocellulose lacquer emulsion in water in an amount sufficient to supply from 0.01% to 0.5% by weight of nitrocellulose solids to the total paste.

18. The composition of matter of claim 4, in which there is incorporated as an additional component from 10% to 100% by weight of nitrocellulose solids based on the amine-aldehyde solids content of the total composition.

19. The composition of matter of claim 13, in which the salt is ammonium formate.

References Cited in the file of this patent

UNITED STATES PATENTS

| | | |
|---|---|---|
| 2,197,357 | Widmer et al. | Apr. 16, 1940 |
| 2,637,705 | Auer | May 5, 1953 |